April 17, 1962  L. G. STINE  3,029,919
INTERCOUPLER

Filed March 2, 1960  5 Sheets-Sheet 1

LESTER G. STINE
*INVENTOR.*

BY *Albert Sperry*

ATTORNEY

April 17, 1962

L. G. STINE 3,029,919

INTERCOUPLER

Filed March 2, 1960

LESTER G. STINE
*INVENTOR.*

BY Albert Sperry.

ATTORNEY

April 17, 1962

L. G. STINE 3,029,919

INTERCOUPLER

Filed March 2, 1960

INVOICE
BEST PAPER COMPANY
1 MAIN STREET
QUALITYTOWN, U.S.A.

SOLD TO
John Jones Company
2 South Street
Anytown, U.S.A.

SHIP TO   Same

| SALESMAN | I.C. | INVOICE NO. | VIA | CUST. ORDER NO. | CLASS. | PACK. | DATE |
|---|---|---|---|---|---|---|---|
| 14 | 2 | 7555 | Best way | 76J496 | W | 6 ctn. | 6/25/59 |

| QUANTITY | UNITS | M | DESCRIPTION | WT. OR QTY. | PRICE | AMOUNT | WT. OR QTY. | COST | COST EXT. |
|---|---|---|---|---|---|---|---|---|---|
| 1750 | SHT | 166 | Grade A white paper | 290.50 | 59.70 C | 173.43 C | 290.50 | 36.22 | 105.22 |
| 4000 | SHT | 146 | Grade A blue paper | 584.00 | 28.80 C | 168.19 C | 584.00 | 20.30 | 118.55 |
|  |  |  | Sub Total |  |  | 341.62 |  |  | 223.77 |
|  |  |  | Sales Tax |  | 3% | 10.25 |  |  |  |
|  |  |  | Total |  |  | 351.87 |  |  |  |

FIG. 4

LESTER G. STINE
*INVENTOR.*

BY *Albert Sperry*

*ATTORNEY*

April 17, 1962        L. G. STINE        3,029,919
INTERCOUPLER

Filed March 2, 1960        5 Sheets-Sheet 4

SALESMAN'S RECORD

NAME: G. Hustler - 14

| DATE | ACCOUNT NO. | MDSE. CATEGORY A | | MDSE. CATEGORY B | | MDSE. CATEGORY C | | GROSS PROFIT |
|---|---|---|---|---|---|---|---|---|
| | | SALES | COST | SALES | COST | SALES | COST | |
| 6/25/59 | 12345 | 341.62 | 223.77 | | | | | 117.85 |

BEST PAPER COMPANY
1 MAIN STREET
QUALITYTOWN, U. S. A.

FIG. 5

John Jones Company
2 South Street
Anywhere, U.S.A.

| DATE AND REFERENCE | ✓ | CHARGE | CREDIT | BALANCE | SALES TO DATE | ≠ PROOF |
|---|---|---|---|---|---|---|
| 6/1/59 | | | | 210.14 | | 210.14 |
| 6/25/59 | | 351.87 | | 562.01 | 351.87 | 913.88 |

BEST PAPER CO.     ACCOUNTS RECEIVABLE     LEDGER CARD

FIG. 6

LESTER G. STINE
*INVENTOR.*

BY *Albert Sperry*

*ATTORNEY*

LESTER G. STINE
INVENTOR.

BY Albert Sperry

ATTORNEY

United States Patent Office 3,029,919
Patented Apr. 17, 1962

3,029,919
INTERCOUPLER
Lester G. Stine, Trenton, N.J., assignor to Automation Engineers, Inc., Trenton, N.J., a corporation of New Jersey
Filed Mar. 2, 1960, Ser. No. 12,392
2 Claims. (Cl. 197—5)

This invention relates to business machines and is directed particularly to equipment for making multiple entries on forms, records or other office or business papers.

It is common practice in modern business establishments to employ calculating and bookkeeping equipment whereby entries may be made to record various transactions or operations. A portion only of the entries made on one record may be needed or desirable on another record. Thus, for example, an invoice or statement may be prepared for a customer by an operator using a calculating typewriter whereby the number of items, the price per item, and the description are entered by typing, whereupon the machine is actuated to enter automatically the total price and also such items as discount, taxes, miscellaneous charges, etc. without requiring the operator to perform the necessary calculations. Certain of these entries may also be required for bookkeeping, accounting, statistical, or inventory purposes which are not to be disclosed to the customer. Thus, the profit on the item may be required for various bookkeeping or accounting purposes and such an entry will only appear on forms or records kept by the company. It has been common practice therefore to employ a bookkeeping or accounting machine to which selected entries from the invoice, statement or other record are transferred for combination with other records to give a current account of the customer's balance, items, inventory, gross profits or the like.

Therefore, two or more different records are generally produced and while certain entries may appear on one record only, a portion of those entries together with other items or calculations may appear on another record. It has, therefore, been necessary heretofore to employ two or more operators or to perform multiple operations in order to prepare the necessary records for a business establishment. Moreover, each time an entry is manually transferred or repeated on a different record, there is a possibility of error with resulting unbalance or discrepancy between the records.

In accordance with the present invention, these objections and limitations inherent in prior office equipment are overcome and means are provided whereby any or all of the entries made on a record in one machine may be entered automatically and simultaneously or ultimately on records in one or more other machines. In this way it is not only possible to reduce the number of operators required to record the entries but errors in the recording of entries are eliminated and the preparation of the records is speeded up. At the same time it is frequently necessary to be able to enter information or data on either machine independently of the other.

These advantages are preferably attained by employing transfer means which may be intercoupled to each of two or more machines to cause an entry made in one machine to be transferred automatically as an entry to another machine. The entries may be transferred in a predetermined manner or selectively to one or more other records whereby several records of different types may be produced simultaneously without danger of error.

The intercoupling means are preferably of a type which permits their application directly to existing machines and they further may be constructed so as to permit the usual manual operation of each machine if and when such operation is necessary or desired so that the normal operation of the machine is not impaired.

Accordingly, the principal object of the present invention is to permit the direct transfer of entries or information from one business machine to other machines for simultaneous or ultimate production of multiple records on two or more machines by a single operator.

Another object of the invention is to provide means adapted for application to existing business machines whereby selected entries made by an operator on one machine may be simultaneously transferred to another machine.

A further object of the invention is to provide transfer means or an intercoupler which may be applied to business machines to program and coordinate the operation thereof.

A specific object of the invention is to provide an intercoupler adapted to be applied to a bookkeeping or accounting machine and connected to a computing typewriter to permit the simultaneous preparation of a record on the computing typewriter while automatically transferring at least some of the entries from the typewriter to the bookkeeping or accounting machine.

These and other objects and features of the present invention will appear from the following description thereof wherein reference is made to the accompanying drawings which illustrate typical and preferred forms of business machines for the purpose of indicating the nature of the invention but without intending to limit the invention thereto.

In the drawings:

FIG. 4 is an illustration of one form of record which may be produced with the assembly of FIG. 1;

FIG. 5 is an illustration of another form of record which may be produced with the assembly of FIG. 1;

FIG. 6 is an illustration of another form of record which may be produced with the assembly of FIG. 1;

Figure 1:
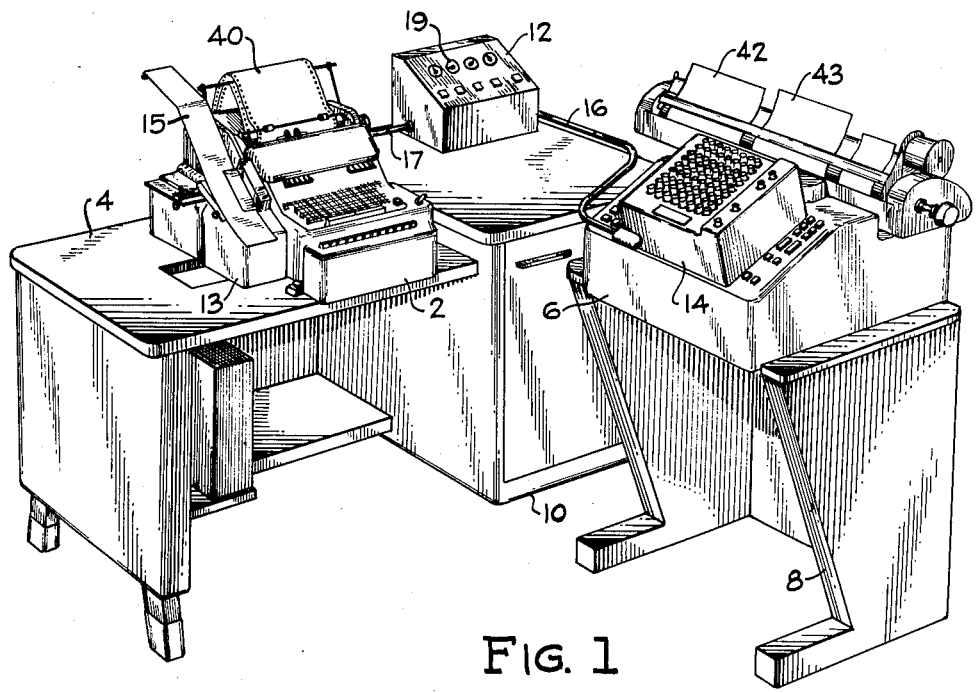
FIG. 1 is a perspective illustrating a typical assembly of business machines embodying the present invention.

In that form of the invention chosen for purposes of illustration in FIGS. 1 to 7 of the drawings, the equipment includes a calculating typewriter 2 positioned on a desk 4, whereas a bookkeeping or accounting machine 6 is positioned on a stand or table 8 in such a location that it may also be operated manually and in the usual manner by a clerk seated in front of the calculating typewriter. A further stand 10 which houses the control unit of the calculating typewriter may be located adjacent the machines 2 and 6.

In accordance with the present invention, an intercoupler consisting of a control unit, indicated generally at 12 and an actuator unit, indicated generally at 14 are interposed between the calculating typewriter and the bookkeeping machine. The intercoupler control unit and actuator unit are connected together by a cable 16 whereas the intercoupler control unit is connected to the calculating typewriter by cable 17 housing the necessary conductors for transferring impulses or information from the calculating typewriter to the intercoupler control unit 12 and thence to the intercoupler actuator unit 14 on the bookkeeping or accounting machine.

The calculating typewriter 2 may further be equipped with a unit 13 for receiving a punched card or tape 15 designed to feed impulses to the typewriter to print out various fixed or usual items such as the customer's name and address and his account number. In addition, such pre-set cards or tape may cause the typewriter or the accounting machine or both to print out fixed items relative to the product ordered such as the name, size, weight, cost, profit and other characteristics of particular items being entered on an invoice or other records. Such data input into the calculating typewriter may be effected in various ways and, if desired, the control unit 12 of the intercoupler may be provided with variable elements such as the dials 19 which can be set to supply some of the data or other information. Such data can be fed back into the calculating typewriter for printing on an invoice form or the like in the calculating typewriter and, if desired, it may be fed also to the bookkeeping or accounting machine for printing on the forms in the accounting machine.

Figure 3:
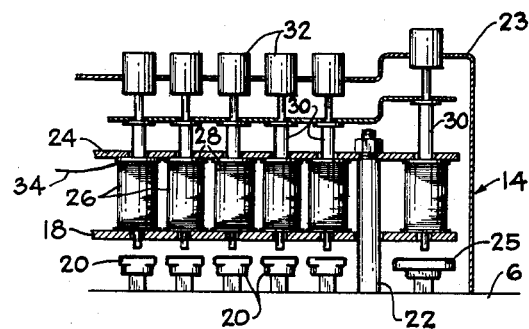
FIG. 3 is a sectional view taken on the line 3—3 of FIG. 2.
Figure 2:
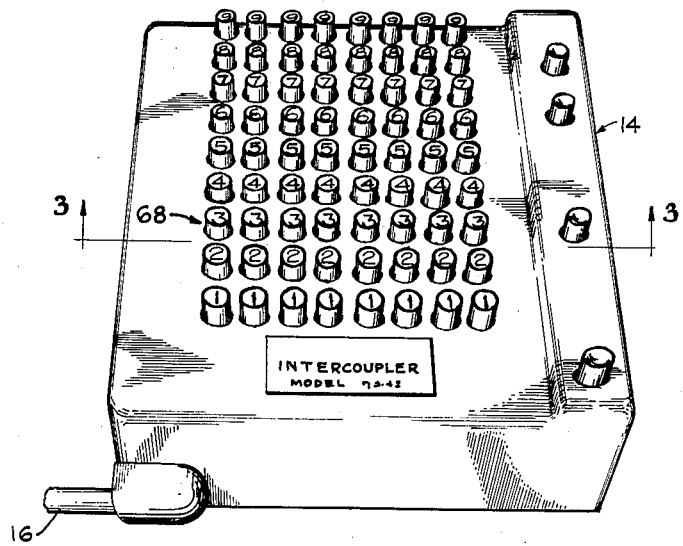
FIG. 2 is an enlarged view in perspective showing a typical form of intercoupler actuaitng device employed in the assembly of FIG. 1.

As shown in FIG. 3, the intercoupler actuator unit 14 is formed with a lower mounting plate 18 adapted to be secured to the cover of the bookkeeping machine over the usual manually operable number keys 20 thereof by means of bolts or fasteners 22. In addition, the intercoupler actuator unit also has an extension 23 which extends over the motor bars or programming keys 25 of the bookkeeping or accounting machine. A top plate 24 is also secured in place by the bolts 22 and is spaced from the mounting plate 18 a distance sufficient to receive the coils 26 of a series of solenoids 28. There is one solenoid 28 for each of the bookkeeping or accounting machine keys that are desired to be intercoupled. Each solenoid is provided with a core or plunger 30 positioned to engage a key 20 or 25 of the bookkeeping or accounting machine. The upper end of each plunger 30 is provided with a head or key 32 which carries the same number or notation as the key 20 or 25 of the bookkeeping or accounting machine over which it is located. The keys 32 of the intercoupler can therefore be depressed manually to actuate the keys 20 and 25 of the bookkeeping or accounting machine in a normal manner when desired. This is particularly important in those installations of the equipment wherein it may be desired to operate the machines in a coordinated manner for only a portion of each day or from time to time without rendering them useless for normal and independent usage.

The intercoupler control unit 12 is designed to receive coded signals from the calculating typewriter through cable 17 and utilizes these signals or impulses to select the particular solenoid of the actuator device 14 which is to be operated. In this way, a predetermined number key or motor bar of the accounting machine is caused to be depressed as desired by operation of a predetermined key of the calculating typewriter.

Figure 8:
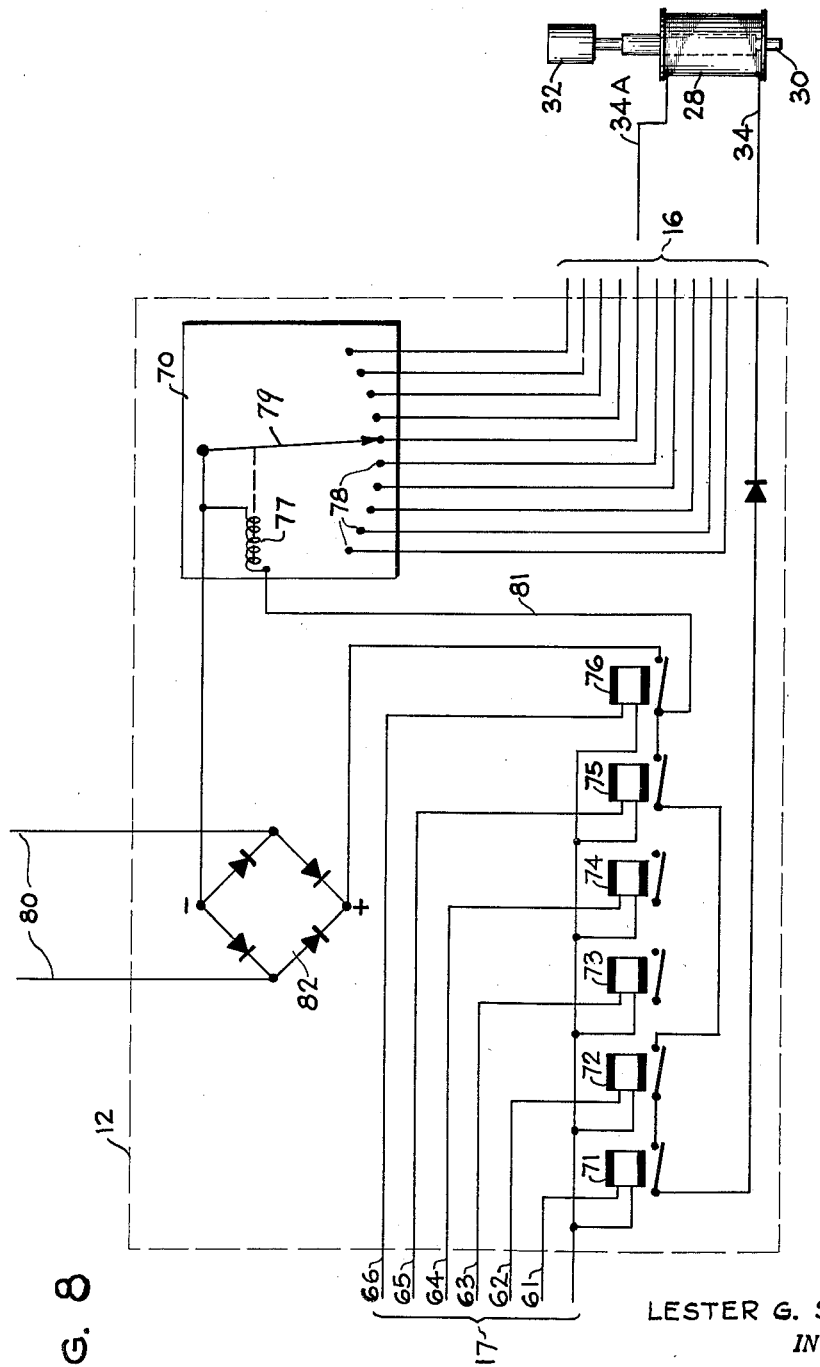
FIG. 8 is a typical wiring diagram of the control device.

In a typical installation, the control device 12 may be organized as shown diagrammatically in FIG. 8. For this purpose, the cable 17 contains a plurality of conductors designated 61, 62, 63, 64, 65 and 66. These conductors are connected to relays in the control device which are numbered 71, 72, 73, 74, 75 and 76. The signals delivered by the calculating typewriter to the conductors 61—66 are coded signals such that current is supplied to different relays or groups of relays in the control device depending upon which number key, space bar or programming key of the calculating typewriter is actuated. Thus, for example, if the key on the calculating typewriter bearing the number "3" is depressed, the signal transmitted to the control device will cause a coded signal to be applied to the conductors of cable 17. If this coded signal is, say 1, 2, 5 and 6, current then will flow in selected lines such as lines 61, 62, 65 and 66 and will serve to actuate the relays 71, 72, 75 and 76. The relays 71, 72 and 75 are designed to determine the solenoids 28 in the actuating device which are associated with the row 68 of keys on the accounting machine (FIG. 2) that bear the number "3" whereas the relay 76 serves to energize the stepping coil 77 of a step switch 70. The step switch has position contacts 78 and a contact arm 79 which serve to determine the position of the key number "3" in the row 68 which is to be actuated. The signals received from the calculating typewriter serve to actuate the relay 76 each time either the space bar or a number key of the calculating typewriter is operated. Therefore, if the key number "3" on the calculating typewriter is to print in the dollar column of a form in the calculating typewriter, the carriage of the typewriter is moved to the proper position by operation of the space bar of the calculating typewriter (six places to the right from the highest figure the calculating typewriter is designed to print). The relay 76 and the stepping coil 77 are thereby actuated to move the contact arm 79 to the sixth contact 78 of the step switch when key number "3" is actuated. Accordingly, when key number "3" is actuated, current will flow from the positive side of current source 80 through line 81 and the contacts of relays 71, 72, 75 and 76 to line 34 and current is then supplied to the solenoid 28 associated with the number key "3" in the sixth position to the right in row 68 of the actuator 14. Current returns from solenoid 28 through line 34A to the sixth contact 78 and thence through contact arm 79 of the step switch to the negative side of the current supply 80. In this way, the control device 12 serves to select the solenoid of the actuating device 14 which is to be energized to cause the accounting machine to print the number "3" in the dollar column of a form contained therein. When each complete number has been printed in this manner by both the calculating typewriter and the accounting machine, the contact arm 79 of the step switch is automatically moved back to its initial position and the system is prepared to receive further actuating impulses from the calculating typewriter in printing another number.

Each number and each motor bar of the accounting machine has its own coded signal so that whenever that signal is received from the calculating typewriter, it is converted into a solenoid operating signal supplied to one of the solenoids 28 of the actuating device 14. The numerical entries and the programming sequence determined by operation of the calculating typewriter are thereby caused to produce a corresponding numerical entry in the proper location on the forms located in the accounting machine.

The wiring diagram of FIG. 8 has been simplified to illustrate one particular operation of the control device 12 but is typical of those circuit arrangements which may be employed in accordance with the present invention. The relays employed may be either mechanical or electronic relays. However, the nature of the coded impulses received from the calculating typewriter may be varied and the manner in which these signals are handled or decoded by the control device 12 may differ with each type and make of calculating typewriter used or when employing business machines other than a calculating typewriter for generating and controlling the signals to be used by the intercoupler. Thus, if the accounting machine 4 is of the type having only ten keys, the actuating device 14 of the intercoupler may be simplified.

When properly connected in the manner described, selected information supplied as output from the calculating typewriter or other source will be transferred to the keys of the bookkeeping or accounting machine by operation of the proper solenoids of the intercoupler. Moreover, when the calculating typewriter has the facility to receive punched or magnetic tape or cards as input, it will be possible to program and transfer selected data as input to the calculating typewriter only or as input to the intercoupler and thence to the bookkeeping or accounting machine only or as input to both the calculating typewriter and bookkeeping or accounting machine. At the same time, all of the keys of the bookkeeping or accounting machine remain available for further operation of the bookkeeping machine whereby it may be operated manually in its normal manner to insert the other entries in the proper columns of the forms in the bookkeeping machine.

In using the equipment described, it is possible to produce numerous forms required in business transactions in a single operation. Thus, the form of FIG. 4 is a Customer's Invoice which is indicated at 40 in FIG. 1. FIG. 5 represents a Salesman's Record which is indicated at 42 in FIG. 1 and is produced by the bookkeeping or accounting machine and FIG. 6 represents an accounts receivable ledger sheet which is indicated at 43 in FIG. 1 and may also be produced by the bookkeeping or accounting machine.

In preparing these forms, the operator may use any of the usual sources of information such as an order blank to obtain the information as to the amount and type of material ordered. At the same time, a customer's card or tape 15 may be used to supply to the equipment the customer's address and account number and other fixed information relative to the customer. Similarly, a product card may be used to supply fixed information relative to the product ordered such as the description, price, weight and other characteristics. Of course, such information may be typed in by the operator if the card or tape 15 is not used.

The invoice form 40 is inserted in the calculating typewriter and at the same time, a salesman's record 42 and a ledger sheet 43 are inserted in the bookkeeping or accounting machine. Various automatic or manual entries then are made on the invoice form in the calculating typewriter to give the customer's account number, name and address, the number and type of the articles covered by the invoice, the price and cost per article, the sales tax and the like. Those numerical entries on the invoice form which are also to appear on forms 42 and 43 are transferred simultaneously to the bookkeeping machine through control device 12 and cable 16 to actuator device 14. Similarly, when the calculating typewriter is actuated to enter calculated data such as the total amount of the sale covered by the invoice, the bookkeeping or accounting machine is simultaneously actuated to enter these totals on one or both of the forms 42 and 43.

The transfer of information from the calculating typewriter to the bookkeeping or accounting machine is effected by connecting the conductors 34 to which the coils 26 of the solenoids 28 are connected to selected contact points in the intercoupler control device 12. The control device 12 in turn is connected to selected contact points on the calculating typewriter to which current is supplied upon operation of the number keys and the programming keys of the typewriter. In this way, electrical impulses corresponding to selected programs and numerical data required on forms 42 and 43 are supplied to selected solenoids 28 of the intercoupler actuator. When thus energized, the solenoids serve to depress the proper keys 25 of the bookkeeping or accounting machine to program the operation of the machine whereas keys 20 are depressed so that the proper entry is made in the proper location on the salesman's record and the ledger sheet.

All those entries which are to appear on several forms can thus be recorded at the same time with the entry being made in a predetermined location on one form and at the same time the same entry will be recorded in a different but predetermined location on other forms. Thus, all of the forms can be filled out in whole or in part by a single typing or manipulation of the calculating typewriter. In this way, it is not only possible to speed up the production of records but it is also possible to eliminate the human error which arises from copying or manual transfer of items from one form to another.

The particular style, type and model of the office machines with which the present invention is employed can be varied greatly. In one installation, for example, the calculating typewriter used is of the type known as a Friden Computyper Model No. CTC, and the bookkeeping machine is of the type known as a Burroughs Accounting Machine Model No. 500. The intercoupler actuator unit 14 is positioned over selected keys of the bookkeeping or accounting machine and is actuated as may be programmed upon operation of predetermined keys or automatic input of the calculating typewriter. At the same time, the keys of the bookkeeping or accounting machine may be operated manually and independently of the calculating typewriter by depressing the keys 32 of the intercoupler 14 whereby the corresponding keys 20 and 25 of the bookkeeping or accounting machine are actuated.

Figure 7:
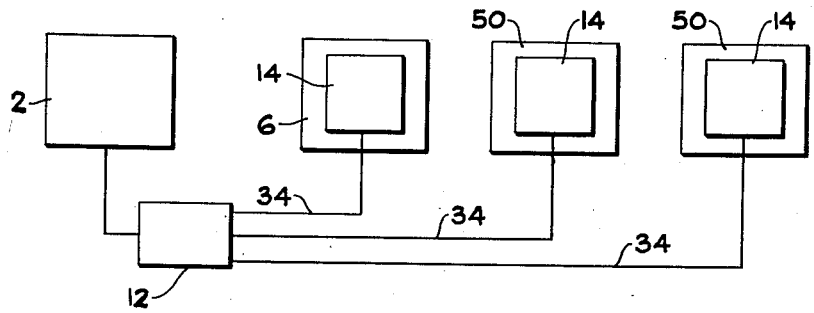
FIG. 7 is a diagrammatic illustration of a further assembly of business machines wherein the present invention may be employed.

The present invention also may be used in combination with other types of business machines and as shown diagrammatically in FIG. 7, it may be employed in producing several different records at the same time. Thus, in addition to the calculating typewriter 2 and the bookkeeping or accounting machine 6, one or more further recording or business machine devices 50 may be employed and each machine may be actuated by an intercoupler actuator unit 14 connected to the intercoupler control device 12.

With assemblies of this type, the calculating typewriter 2 may be used to make out an invoice, the bookkeeping machine 6 may be employed to make the proper entries on a monthly statement for the customer and accounting department, whereas the recording device 50 may produce a record of sales for use by the sales department or to keep a running inventory for use by the purchasing department or a warehouse.

Additional recording devices 50 may also be connected to the control device 12 of the calculating typewriter for making other or specialized records such as a statement of the taxes collected, the freight or postage charges incurred in sales and so forth. Thus, one record may remain in one recording device for a whole day or while numerous invoices are made out so that it is not necessary for the operator to change all of the records each time one record is produced. In such applications of the invention, it is not necessary to cause every machine to print at the same time since a portion of the data may merely be stored up on registering elements for subsequent totalizing or printing of accumulated data when required.

The foregoing illustrations of various applications of the present invention have been cited as typical of uses and types of business machines in which the present invention may be employed. However, many other combinations and arrangements of business machines are possible and anticipated in the use of the intercoupler. Moreover, if desired, the intercouplers may be embodied directly in the business machines so as to be housed within the casing and below the keys thereof in order to provide a neat and permanent installation.

These and other changes and modifications of the present invention will be apparent to those skilled in the art of business machines. In view thereof, it should be understood that the particular embodiments of the invention shown in the drawings and described above are intended to be illustrative only and are not intended to limit the scope of the invention.

I claim:

1. Means for producing a plurality of business forms simultaneously comprising the combination of a first business machine having number keys together with a carriage for receiving a form to be printed, a second business machine having a plurality of rows of number keys thereon and a carriage for receiving a form to be printed, actuating means on the second business machine associated with each key thereof and operable when energized to actuate a selected key of the second business machine, control means electrically connected to the first business machine and receiving coded electrical impulses therefrom upon the printing of a number on a form in the first business machine, code translating elements in said control means responsive to said coded impulses to select the row of keys in the second business machine in which a key is to be actuated, other elements in said control means responsive to the position of the carriage in the first business machine for determining the key in the selected row which is to be actuated, and electrical circuits for energizing the actuating means associated with the key thus determined to print a record on a form in the second business machine.

2. An intercoupler for transmitting selected information in the form of electrical signals from one business machine to another comprising an actuator device adapted to be applied to the keys of the business machine which is to receive the information and including solenoids which, when energized, will actuate said keys, and a control device connected to the solenoids of said actuator and adapted to be connected to the one business machine from which information is to be received, said control device including relays selectively operable in response to the signals received from said one business machine to select a group of said solenoids, a selector responsive to said signals for selecting which of the solenoids of said group is to be energized, and a circuit controlled by said relays and selector for energizing the solenoids of said actuator device thus selected.

References Cited in the file of this patent

UNITED STATES PATENTS

| | | |
|---|---|---|
| 1,753,991 | Langford | Apr. 8, 1930 |
| 2,858,922 | Kloid | Nov. 4, 1958 |

FOREIGN PATENTS

| | | |
|---|---|---|
| 547,152 | Italy | Aug. 10, 1956 |